United States Patent
Chigira et al.

(10) Patent No.: US 6,992,833 B2
(45) Date of Patent: Jan. 31, 2006

(54) COLOR COMBINING OPTICAL SYSTEM, PROJECTION-TYPE DISPLAY OPTICAL SYSTEM, PROJECTION-TYPE IMAGE DISPLAY APPARATUS, AND IMAGE DISPLAY SYSTEM

(75) Inventors: Tatsuo Chigira, Tochigi (JP); Atsushi Okuyama, Saitama (JP); Masayuki Abe, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/631,393

(22) Filed: Jul. 31, 2003

(65) Prior Publication Data
US 2005/0174652 A1    Aug. 11, 2005

(30) Foreign Application Priority Data
Jul. 31, 2002    (JP)    .............................. 2002-224016

(51) Int. Cl.
*G02B 27/10*    (2006.01)

(52) U.S. Cl. ...................... 359/629; 359/634; 359/638; 359/639

(58) Field of Classification Search ................ 359/629, 359/634, 636, 638–640; 348/335–338; 349/5, 8–9; 353/1–34, 81, 37–38
See application file for complete search history.

(56) References Cited

U.S. PATENT DOCUMENTS

| | | | | |
|---|---|---|---|---|
| 6,157,419 | A * | 12/2000 | Mitsutake ...................... 349/9 |
| 6,176,586 | B1 | 1/2001 | Hirose et al. .................. 353/31 |
| 6,183,091 | B1 | 2/2001 | Johnson et al. ............... 353/20 |
| 6,252,638 | B1 | 6/2001 | Johnson et al. ................ 349/5 |
| 6,273,571 | B1 | 8/2001 | Sharp et al. ................. 353/122 |
| 6,310,673 | B1 | 10/2001 | Sharp ......................... 349/106 |
| 6,379,010 | B1 * | 4/2002 | Suzuki et al. ................. 353/31 |
| 6,380,997 | B1 | 4/2002 | Sharp et al. ................. 349/119 |
| 6,417,892 | B1 | 7/2002 | Sharp et al. ................. 348/742 |
| 6,452,646 | B1 | 9/2002 | Sharp et al. .................. 349/18 |
| 6,457,829 | B1 * | 10/2002 | Nakazawa et al. ............. 353/31 |
| 6,671,101 | B2 * | 12/2003 | Sugawara .................... 359/634 |
| 6,704,065 | B1 | 3/2004 | Sharp et al. ................... 349/5 |
| 2001/0033253 | A1 * | 10/2001 | Manabe et al. ............... 345/32 |
| 2002/0001135 | A1 | 1/2002 | Berman et al. ............. 359/640 |
| 2002/0003668 | A1 | 1/2002 | Sugawara .................... 359/634 |

(Continued)

FOREIGN PATENT DOCUMENTS

JP    7-306405    11/1995

(Continued)

OTHER PUBLICATIONS

Communication (European Search Report) from European Patent Office dated Dec. 4, 2004 for Appl. No. 03254735.8-2217.

(Continued)

*Primary Examiner*—Jordan M. Schwartz
*Assistant Examiner*—Jessica Stultz
(74) *Attorney, Agent, or Firm*—Morgan & Finnegan, L.L.P.

(57) ABSTRACT

A color combining optical system which can suppress occurrence of a thermal problem and increase in size is disclosed. The color combining optical system comprises a first optical element which has a first optical film reflecting light having a first polarizing direction and transmitting light in a second polarizing direction and combines the first and second color lights by the first optical film. In addition, the optical system comprises a polarizing plate which analyzes a third color light. Furthermore, the optical system comprises a second optical element which combines, by a second optical film, the third color light transmitted through the polarizing plate with the first and second color lights combined by the first optical element.

34 Claims, 4 Drawing Sheets

U.S. PATENT DOCUMENTS

2002/0071102 A1    6/2002    Takimoto et al. ............. 353/31

FOREIGN PATENT DOCUMENTS

| JP | 2001-290010 | 10/2001 |
| JP | 2002-169221 | 6/2002 |
| WO | WO2003034144 | 4/2003 |

OTHER PUBLICATIONS

English translation of JP2002-169221; and.
English translation of JP2002-122810.

* cited by examiner

COLOR COMBINING OPTICAL SYSTEM, PROJECTION-TYPE DISPLAY OPTICAL SYSTEM, PROJECTION-TYPE IMAGE DISPLAY APPARATUS, AND IMAGE DISPLAY SYSTEM

BACKGROUND OF THE INVENTION

1. Field of the Invention

The present invention relates to a color combining optical system for combining three color lights, and a projection-type display optical system and a projection-type image display apparatus using the same color combining optical system.

2. Description of the Related Art

In a conventional liquid crystal projector, by improving light utilization efficiency by shortening the arc length of a lamp to illuminate a liquid crystal display element as much as possible and/or by heightening the aperture ratio of a liquid crystal display element, a high-brightness projected image has been realized.

In the present condition, some products using a 0.7-inch small-sized transmissive liquid crystal display element have a brightness above 1000 ANSI lm. Moreover; simultaneously with a high brightness, downsizing of a liquid crystal projector has also been realized.

A conventional liquid crystal projector has an optical system as proposed in Japanese Patent Laid-Open No. 2001-290010 (corresponding to U.S. patent application Publication No. 2002-003668), for example. Namely, on the side of illumination of an illuminating light of transmissive liquid crystal display elements, which modulate light separated into red, green, and blue, respectively, an entrance-side polarizing plate as a polarizer and, on the side of emergence of a color combining optical system for combining the respective color lights modulated by the liquid crystal display elements, an exit-side polarizing plate as an analyzer are arranged so that their polarizing directions are orthogonal to each other. When the liquid crystal display element displays black, since a light transmitted through the liquid crystal display element is absorbed in the exit-side polarizing plate, black can be displayed.

In greater detail, respective color illuminating lights of blue, green, and red are, after being transmitted through entrance-side polarizing plates corresponding to the respective colors, made incident into liquid crystal display elements corresponding to the respective colors and modulated. Then, the respective color image lights modulated by the liquid crystal display elements are, after being transmitted through exit-side polarizing plates, combined by a dichroic prism and projected in an enlarged manner by a projection lens onto a screen. As such, a color combining optical system for combining three color image lights is composed of the polarizing plates and the dichroic prism.

In addition, in Japanese Patent Laid-Open No. H07 (1995)-306405, proposed is an optical system which employs polarization beam splitters in place of exit-side polarizing plates as described above and reflects, when displaying black, a light transmitted through a crystal display element in a direction not to proceed toward a projection lens. Furthermore, the optical system proposed in the above-described Japanese Patent Laid-Open No. H07 (1995)-306405 employs polarization beam splitters in place of the entrance-side polarizing plates as a polarizer and the exit-side polarizing plate as an analyzer and is further separately provided with a color combining member to carry out a color combination.

However, in the liquid crystal projector as proposed in the above-described Japanese Patent Laid-Open No. 2001-290010, if, for example, power consumption of a lamp is raised to increase the illuminating light amount so as to realize a high brightness liquid crystal projector, the amount of light which must be absorbed by the exit-side polarizing plate is increased when black is displayed, therein arises a thermal problem such that performance of the exit-side polarizing plate is deteriorated.

This problem has been solved by spraying cooling air onto the polarizing plates by a fan or other methods, however, if the cooling air is strongly sprayed onto the polarizing plate, a sound during spraying the cooling air and the noise of the fan are increased.

On the other hand, in the liquid crystal projector as proposed in Japanese Patent Laid-Open No. H07(1995)-306405, since polarization beam splitters are used as a polarizer and an analyzer, even if the illuminating light is increased to brighten the liquid crystal projector, no thermal problem occurs, however, a color combination of the three colors must be carried out by a polarization beam splitter for a color combination, which is provided separately from the polarization beam splitter as an analyzer, and a dichroic prism.

Accordingly, back focal distance of the projection lens is extended, and accordingly the projection lens becomes large, therefore, the whole liquid crystal projector is increased in size.

SUMMARY OF THE INVENTION

It is an object of the present invention to provide a color combining optical system, a projection-type image display apparatus, and an image display system which can suppress occurrence of a thermal problem and increase in size even when a high brightness is realized by increasing the capacity of a lamp as a light source.

In order to achieve the above-described object, according to the present invention, a color combining optical system which combines first, second, and third color lights comprises a first optical element which has a first optical film reflecting light having a first polarizing direction and transmitting light having a second polarizing direction different from the first polarizing direction and combines the first and second color lights by the first optical film. In addition, it comprises a polarizing plate which analyzes the third color light. Furthermore, it also comprises a second optical element which has a second optical film reflecting light in a specific wavelength region and transmitting light in other wavelength regions and combines the third color light transmitted through the polarizing plate with the first and second color lights combined by the first optical element.

Features of a color combining optical system, a projection-type display optical system, a projection-type image display apparatus, and an image display system of the invention will become more clear from the following detailed description with reference to the drawings.

DETAILED DESCRIPTION OF THE PREFERRED EMBODIMENTS

Hereinafter, preferred embodiments of the present invention will be described in detail with reference to the drawings.

Embodiment 1

Figure 1:
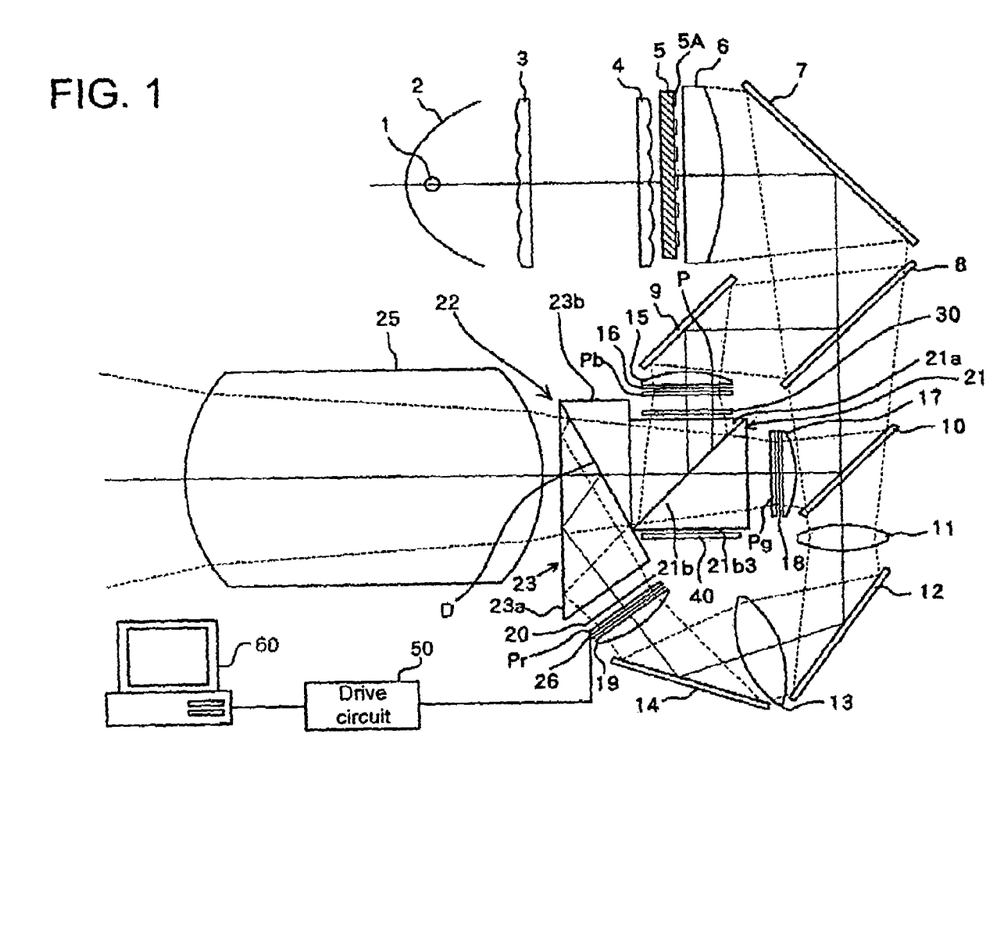
FIG. 1 is a schematic view showing the main part of a liquid crystal projector having a projection-type display optical system of Embodiment 1 of the present invention.

FIG. 1 shows a schematic structure of a liquid crystal projector (a projection-type image display apparatus) using a projection-type display optical system of Embodiment 1 of the present invention.

In FIG. 1, reference numeral 1 denotes a light source such as a super high-pressure mercury lamp. Reference numeral 2 denotes a reflector having a paraboloidal-shaped reflective surface (this may be an ellipsoidal shape), and a paraboloidal-shaped mirror is illustrated in the drawing.

A light flux emitted from the light source 1 is converted to an approximately parallel light by being reflected by the reflector 2 and is made incident into a first fly-eye lens 3. The first fly-eye lens 3 is structured by arranging a plurality of rectangular lenses (convex lenses) having a positive optical power on a flat plate.

Reference numeral 4 denotes a second fly-eye lens into which a light flux emerged from the first fly-eye lens 3 is made incident, and this is structured by arranging a plurality of rectangular lenses (plano-convex lenses) having a positive optical power on a flat plate. A light source image is formed almost at the center part of the respective lenses of the second fly-eye lens 4.

Reference Numeral 5 denotes a polarization converting element array, which makes a non-polarized (randomly polarized) light made incident into each polarization converting element emerge as a linear polarized light having a specific polarizing direction. The polarizing directions of polarized lights emerging from the respective polarization converting elements are mutually coincident.

A light made incident into the polarization converting element array 5 is, as a result of transmission of a P-wave (P-polarized light) and reflection of an S-wave (S-polarized light) at a polarization splitting layer (unillustrated), split into a P-wave and an S-wave. The P-wave is phase-converted by a λ/2 phase plate 5A to be aligned with the S-wave in terms of the polarization axis direction. Accordingly, light fluxes emerging from the polarization converting element array 5 all become polarized lights having polarization axes in an identical direction. A polarization splitting layer (unillustrated) of the polarization converting element array 5 may have a characteristic of reflecting a P-wave and transmitting an S-wave.

A light flux emerged from the polarization converting element array 5 is condensed by a first positive lens 6, is color-separated into three color light components of R (red), G (green), and B (blue) by a color separating optical system (which will be described later). Then, the three color light components are irradiated onto the display portions of transmissive liquid crystal display panels (image forming elements) Pr, Pg, and Pb provided for the respective RGB colors.

Each of the transmissive liquid crystal display panels Pr, Pg, and Pb is a well-known transmissive liquid crystal display panel and has an effect to, when transmitting light, turn the polarizing direction of a polarized light made incident into specific pixels out of pixels contained by the liquid crystal display panel by 90° in accordance with signals outputted from an drive circuit 50 (described later) on the basis of image information from an image information supplying apparatus 60 (described later), that is, a function to convert a part of the incident light made incident as an S-polarized light to a P-polarized light. Herein, such display panels are composed of TN-type liquid crystal display elements, for example.

In the present embodiment, out of the light flux emerged from the first positive lens 6, the blue light component reflected by a blue reflective dichroic mirror 8 is condensed in an S-polarized state at the display portion of the blue-light transmissive liquid crystal display panel Pb via a high-reflection mirror 9, a second positive lens 15, and a blue-light entrance-side polarizing plate 16. Then, a blue light (S-polarized light) made incident into, out of multiple pixels contained by the blue-light transmissive liquid crystal display panel Pb, a part of pixels corresponding to light (image light) projected onto a projection surface (unillustrated) such as a screen is converted from the S-polarized light to a P-polarized light.

The green light component out of green and red light components transmitted through the blue reflective dichroic mirror 8 is reflected by a green reflective dichroic mirror 10 and is condensed in an S-polarized state at the display portion of the green-light transmissive liquid crystal display panel Pg via a third positive lens 17 and a green-light entrance-side polarizing plate 18. Then, the green-light (S-polarized light) made incident into, out of multiple pixels contained by the green-light transmissive liquid crystal display panel Pg, a part of pixels corresponding to light (image light) projected onto the projection surface is converted from the S-polarized light to a P-polarized light.

Furthermore, the red light component transmitted through the green reflective dichroic mirror 10 is condensed at the display portion of the red-light transmissive liquid crystal display panel Pr via a fourth positive lens 11, a high-reflection mirror 12, a fifth positive lens 13, a high reflection mirror 14, a sixth positive lens 19, and a red-light entrance-side polarizing plate 26.

Then, the red light (S-polarized light) made incident into, out of multiple pixels contained by the red-light transmissive liquid crystal display panel Pr, a part of pixels corresponding to light (image light) projected onto the projection surface is converted from the S-polarized light to a P-polarized light.

Herein, as mentioned above, the light made incident into the liquid crystal display panel for each color is not necessarily an S-polarized light, and a P-polarized light may be made incident by the P-polarized light emerging from the polarization converting element.

In the fourth positive lens 11 and fifth positive lens 13, since only red channels are longer in the optical paths than other color channels, these play a role of relay lens system for approximately full-size image formation.

To each transmissive liquid crystal display panel, a drive circuit 50 is connected, and to the drive circuit 50, image information from an image information supplying apparatus 60 such as a personal computer, a video, a television, a DVD player, a digital camera (still or video camera) is supplied. The drive circuit 50 outputs a signal to make each transmissive liquid crystal display panel display an original image based on the supplied image information. Light made incident into each transmissive liquid crystal display panel is modulated according to the displayed original image.

As such, the projector according to the present embodiment forms an image display system by a combination with the image information supplying apparatus such as a personal computer. These are similar in the following embodiments as well though the image information supplying apparatus is not illustrated.

The blue light component modulated by the blue-light transmissive liquid crystal display panel Pb is, after being converted in its polarizing direction by 90° becoming an S-polarized light by a half-wave plate 30, made incident into a prism 21a of a polarization beam splitter (a first optical element) 21. This polarization beam splitter 21 is constructed by joining two prisms 21a and 21b having a mutually identical triangle pole shape and forming, at the joint surface, a polarization splitting film (a first optical film) P for reflecting an S-polarized light and transmitting a P-polarized light. Out of the blue light component made incident into the prism 21a, the S-polarized light component which is an image light is selectively reflected by the polarization splitting film P, whereby an analysis is carried out.

Herein, between the blue-light transmissive liquid crystal display panel Pb and polarization beam splitter 21, only the half-wave plate 30 is arranged but no polarizing plate is arranged.

In addition, the green light component modulated by the green-light transmissive liquid crystal display panel Pg is made incident into the prism 21b of the polarization beam splitter 21. And, only a P-polarized light component is transmitted through the polarization splitting film P, whereby an analysis is carried out. Thus, the blue S-polarized light component reflected by the polarization splitting film P and the green P-polarized light component transmitted through the polarization splitting film P are combined and emerge from the polarization beam splitter 21.

Furthermore, the red light component modulated by the red-light transmissive liquid crystal display panel Pr is, after being analyzed by a red-light exit-side polarizing plate 20, made incident into a prism 23a of a dichroic prism (a second optical element) 23. This dichroic prism 23 is constructed by joining two prisms 23a and 23b having triangle pole shapes mutually different in size and forming, at the joint surface, a dichroic film (a second optical film) D for reflecting a red light component and transmitting blue and green light components.

The red light component made incident into the prism 23a is reflected twice including a reflection on the dichroic film D and emerges from the dichroic prism 23 in a manner combined with the blue and green light components transmitted through the dichroic film D.

Herein, in the present embodiment, description has been given in a case wherein the red light component is reflected twice within the dichroic prism 23, however, the number of reflection times is not limited hereto and may be once, three times or more.

Herein, in the present embodiment, a color combining prism (a color combining optical system) 22 is composed of the polarization beam splitter 21 and dichroic prism 23.

The three-color image lights combined by the color combining prism 22 and emerged as such are projected by a projection lens 25 onto a screen (unillustrated), whereby a full color image is displayed.

Figure 2:
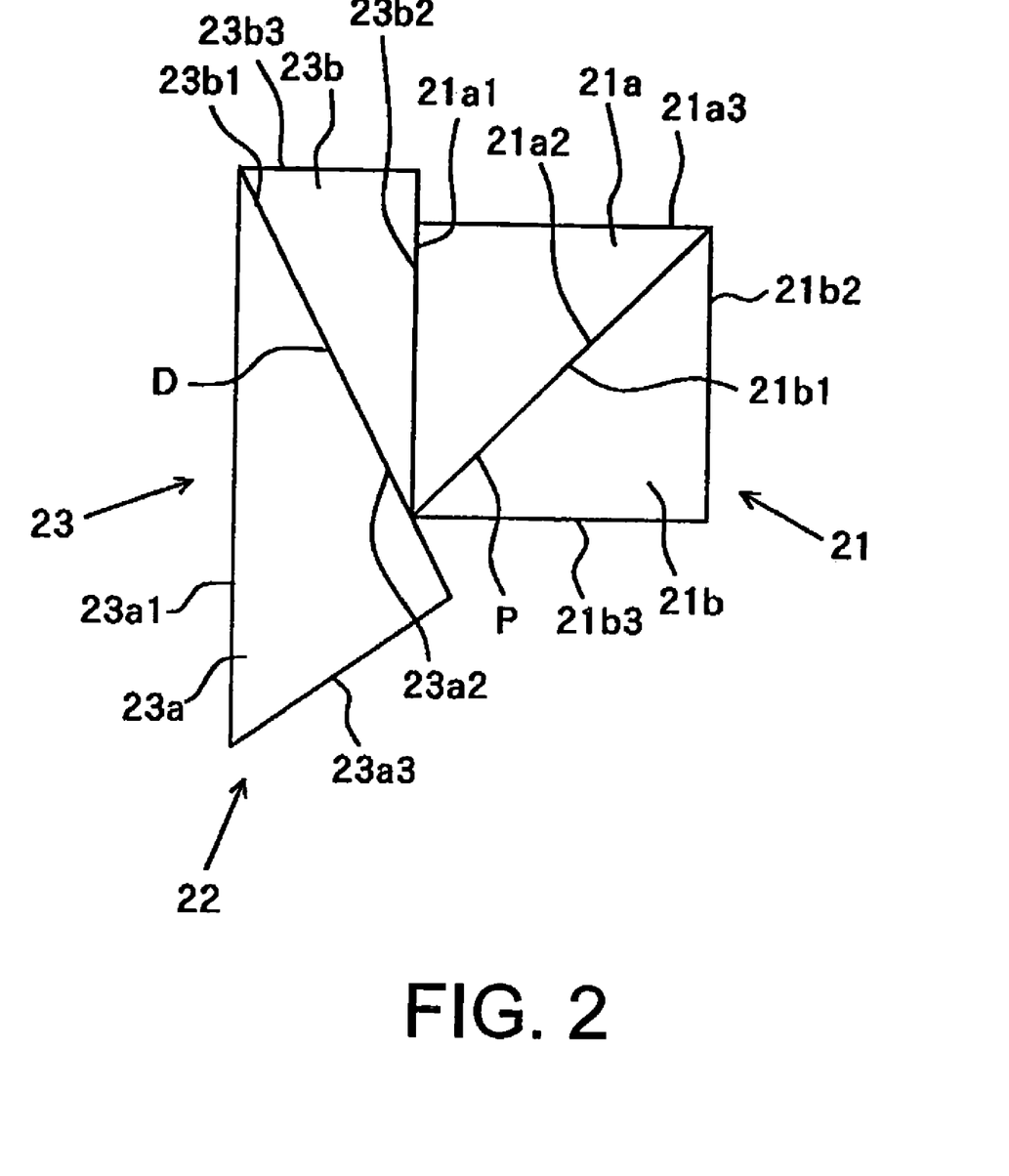
FIG. 2 is an explanatory view of a color combining prism of the projection display optical system as shown in FIG. 1.

Now, a structure of the aforementioned color combining prism 22 will be described in greater detail by use of FIG. 2.

The color combining prism 22 is, as described above, composed of the prisms 21a and 21b of the polarization beam splitter 21 and the prisms 23a and 23b of the dichroic prism 23. The color combining prism 22 formed of four prisms as such is also referred to as a four-piece prism.

The prism 21a has a transmissive surface (a first (or second) incident surface) 21a3 which is an incident surface for the blue light component, a polarization splitting surface 21a2 on which a polarization splitting film P for reflecting an S-polarized light and transmitting a P-polarized light has been formed by vapor deposition, and a transmissive surface (first emergent surface) 21a1 which is an emergent surface for the blue and green light components. An S-polarized component out of the blue light component made incident through the transmissive surface 21a3 of the prism 21a is analyzed by being reflected by the polarization splitting film P, and emerges from the transmissive surface 21a1.

The prism 21b has a transmissive surface (a second (or first) incident surface) 21a2 which is an incident surface for the green light component, a transmissive surface 21b1 to be joined to the polarization splitting surface 21a2 of the prism 21a, and a transmissive surface (a second emergent surface) 21b3 as a non-optical effective surface. A P-polarized component out of the green light component made incident into the prism 21b through the transmissive surface 21b2 and emerged from the transmissive surface 21b1 is analyzed by being transmitted through the polarization splitting film P, and emerges from the prism 21a by further being transmitted through the prism 21a. Thus, the blue S-polarized light component reflected by the polarization splitting film P and the green P-polarized light component transmitted through the polarization splitting film P are combined.

Herein, it is desirable that the prisms 21a, 21b, 23a and 23b transmit light while maintaining a polarized state, and low-photoelasticity glass is preferably employed as a material of the prisms 21a, 21b, 23a, and 23b.

The prism 23a has a surface (a third emergent surface) 23a1 which is a transmissive surface as an emergent surface and is also an internal reflecting surface to satisfy total reflection conditions for a red light component to be made incident, a dichroic surface 23a2 on which a dichroic film D for reflecting a red light component and transmitting blue and green light components has been formed by vapor deposition, and a transmissive surface (a fourth emergent surface) 23a3 which is an incident surface for the red light component.

In addition, the prism 23b has a transmissive surface 23b1 to be joined to the dichroic surface 23a2 of the prism 23a, a transmissive surface (a third incident surface) 23b2 which is an incident surface for the blue and green light components emerged from the prism 21a, and a non-optical effective surface 23b3 as a transmissive surface.

The red light component made incident through the transmissive surface 23a3 of the prism 23a is first totally reflected by the surface 23a1 and is then reflected by the dichroic film D. And, at this time, the red light component is combined with blue and green light components transmitted through the prism 23b and dichroic film D and is then transmitted through the surface 23a1 to emerge from the prism 23a (namely, the color combining prism 22).

Herein, it is desirable to form, on the transmissive surfaces 21a3, 21b2, 23a3, and 23a1, an antireflection coating film so as to prevent a light amount loss due to a surface reflected light produced at a boundary between the air and glass.

In addition, it is desirable to form, on the transmissive surface 21b3 of the prism 21b, as well, an antireflection coating film so as to prevent unnecessary light produced by analysis at the polarization splitting film P from returning to the optical path for the projection by a surface reflection on the transmissive surface 21b3 and deteriorating a projected image in contrast.

Herein, in the present embodiment, as shown in FIG. 1, in order to prevent, out of the blue light component, an unnecessary P-polarized light component transmitted through the polarization splitting film P and emerged from the transmissive surface (non-optical effective surface) 21b3 of the prism 21b from being irradiated into other optical paths or causing heat in other optical paths, a light absorbing member 40 as a light processing member is arranged in a manner opposed to the transmissive surface 21b3 so as to absorb the unnecessary blue light emerged from the transmissive surface 21b3.

In addition, the light absorbing member 40 provides similar effects for a green light component, as well. Herein, in order to prevent, out of the green light component, an unnecessary S-polarized light component reflected by the polarization splitting film P and emerged from the transmissive surface (non-optical effective surface) 21b3 of the prism 21b from being irradiated into other optical paths or causing heat in other optical paths, the aforementioned light absorbing member 40, which is arranged in a manner opposed to the transmissive surface (non-optical effective surface) 21b3, is used so as to absorb the green unnecessary light emerged from the transmissive surface 21b3.

In a conventional optical system, unnecessary light has been absorbed by a polarizing plate having high analysis performance (this used to be a cause of heat generation), however, in the present embodiment, since no such polarizing plate is provided in the optical path of the blue light component, it is desirable to provide the light absorbing member 40 to prevent unnecessary light from returning to any of the optical paths for projection again.

Herein, as the light absorbing member 40, an aluminum plate to which black painting has been applied after a black alumite treatment can be used. Furthermore, by arranging this aluminum plate with a tilt with respect to the optical path, even if a slight amount of light to be reflected without being absorbed by the light absorbing member 40 is included in the unnecessary light, this can be prevented from returning to the optical path in the prism 21.

In addition, it is preferable that the non-optical effective surface 23b3 of the prism 23b is, in order to prevent ghost caused by internal reflection in the prism 23b, not a polished surface but a sand ground surface, and furthermore, black paint is preferably applied.

In addition, the dichroic film D formed on the dichroic surface 23a2 of the prism 23a may be formed on the transmissive surface 23b1 of the prism 23b. Since the prism 23b is smaller than the prism 23a, more prisms can be placed in a vapor deposition chamber when carrying out a vapor deposition of a dichroic film D, therefore, manufacturing costs can be reduced.

In addition, the polarization splitting film P formed on the polarization splitting surface 21a2 of the prism 21a may be formed on the transmissive surface 21b1 of the prism 21b.

By such a structure as in the above, a green light, which is high in energy since the wavelength is short and is contained by a large amount in a blue light and white light, can be analyzed by a polarization beam splitter 21, therefore, it becomes unnecessary to provide an exit-side polarizing plate, whose performance is deteriorated by heat if a strong illuminating light is made incident, in the optical paths of the blue and green light components. Thereby, an exit-side polarizing plate having high analysis performance (namely, greater in the amount of light to be blocked) can be eliminated, and a projected image through the liquid crystal projector can be brightened.

Furthermore, a general polarization beam splitter has, particularly in terms of an angled light, a higher reflectivity in an S-polarized light than transmittance in a P-polarized light. Accordingly, analysis with an S-polarized light (namely, an S-polarized light of unnecessary light is reflected by the polarization beam splitter and is deflected from its optical path for projection onto a projection surface) is higher in performance as an analyzer than analysis with a P-polarized light (namely, a P-polarized light of unnecessary light is transmitted through the polarization beam splitter and is deflected from its optical path for projection onto the projection surface). With regard to this aspect, since visibility is high in the present embodiment and a green light component, which strongly influences contrast, is analyzed with an S-polarized light, a high contrast can be obtained in a projected image.

Herein, a polarizing plate may be arranged only either between the green-light liquid crystal display panel Pg and polarization beam splitter (first optical element) 21 or between the blue-light liquid crystal display panel Pb and polarization beam splitter 21. In addition, a member for blocking light other than a light component in a specific polarizing direction or a member such as a polarization beam splitter for splitting a specific polarized light component away from other polarized light components may be arranged. If a polarizing plate is arranged, analysis can be carried out twofold by the polarizing plate and polarization beam splitter, therefore, a color light component which passes through the optical path with the polarizing plate arranged can be improved in polarization purity. However, in Embodiment 1, in terms of a green light having a high relative visibility, since analysis performance by the polarization beam splitter is sufficiently high, no polarizing plate is arranged. Moreover, in terms of a blue light component, for the reason that energy is high since the blue light wavelength is short and performance is deteriorated at a high temperature, no polarizing plate is arranged. As a matter of course, if the above problems are solved, a polarizing plate may be arranged on the optical path of the blue light.

In addition, in terms of a red light component, whose exit-side polarizing plate is relatively hardly damaged, the exit-side polarizing plate 20 is provided and a color combination is carried out by a dichroic film D after a total reflection in the prism 23a (namely, reflected twice), therefore, the back focal distance of the projection lens 25 can be shortened, whereby the liquid crystal projector (projection-type image display apparatus) can be reduced in size.

Embodiment 2

Figure 3:
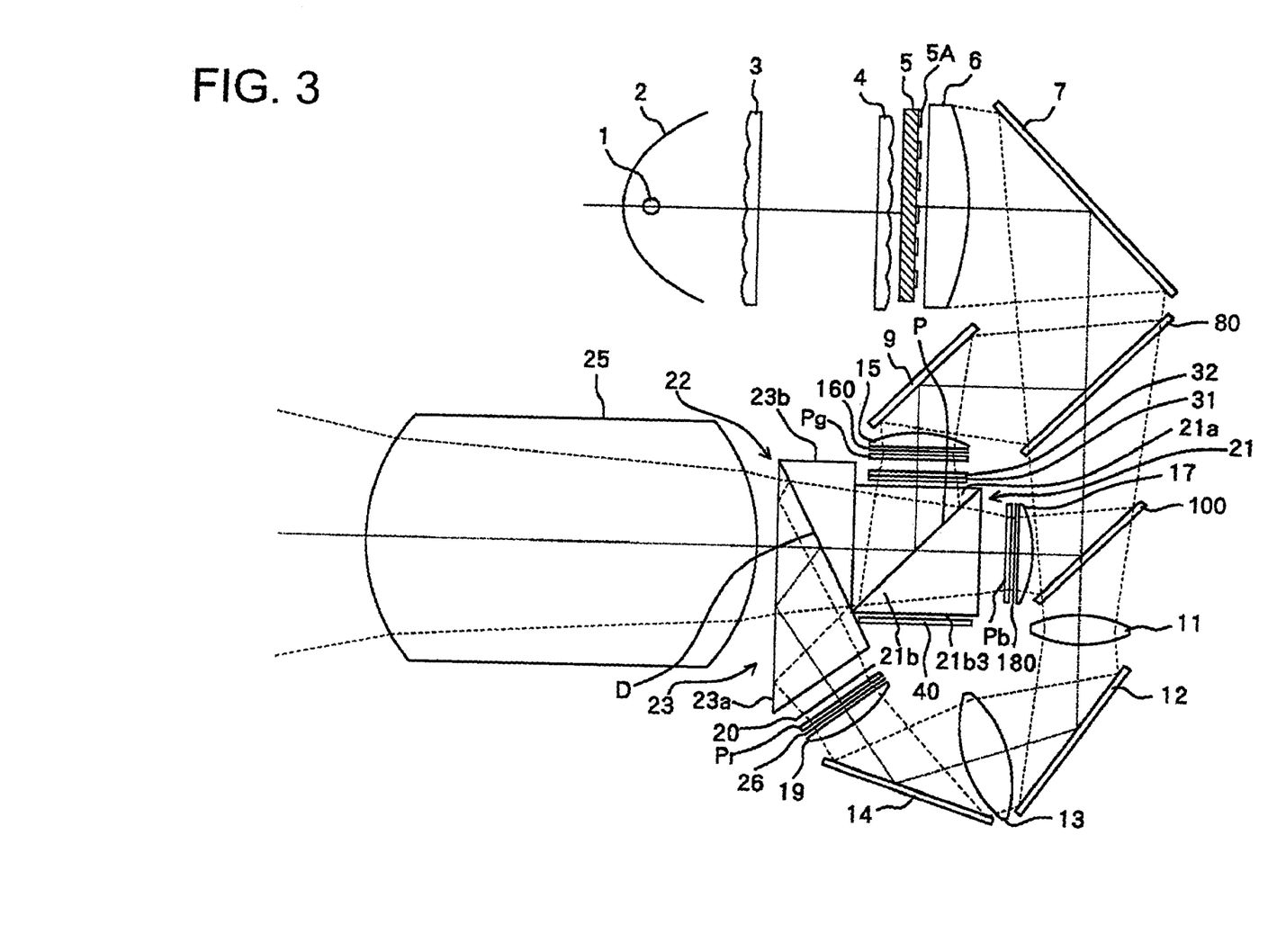
FIG. 3 is a schematic view showing the main part of a liquid crystal projector having a projection-type display optical system of Embodiment 2 of the present invention.

FIG. 3 shows a schematic structure of a liquid crystal projector (a projection-type image display apparatus) using a projection-type display optical system of Embodiment 2 of the present invention. Herein, the present embodiment is identical in its basic structure to Embodiment 1, therefore, symbols identical to those of Embodiment 1 are used for common components, and a description thereof is substituted by the identical symbols.

In the present embodiment, out of the light flux emerged from a first positive lens 6, a green light component reflected by a green reflective dichroic mirror 80 is condensed in an S-polarized state at the display portion of a green-light transmissive liquid crystal display panel Pg via a high-reflection mirror 9, a second positive lens 15, and a green-light entrance-side polarizing plate 160.

A blue light component out of blue and red light components transmitted through the green reflective dichroic mirror 80 is reflected by a blue reflective dichroic mirror 100 and is condensed in an S-polarized state at the display portion of a blue light transmissive liquid crystal display panel Pb via a third positive lens 17 and a blue-light entrance-side polarizing plate 180.

A red light component transmitted through the blue reflective dichroic mirror 100 is condensed at the display portion of a red-light trasmissive liquid crystal display panel Pr via a fourth positive lens 11, a high reflection mirror 12, a fifth positive lens 13, a high reflection-mirror 14, a sixth positive lens 19, and a red-light entrance-side polarizing plate 26. In the fourth positive lens 11 and fifth positive lens 13, since only red channels are longer in the optical paths than other color channels, these play a role of relay lens system for approximately full-size image formation.

The blue light component modulated by the green-light transmissive liquid crystal display panel Pg is, after being converted in its polarizing direction by 90° by a half-wave plate 32, transmitted through a green-light exit-side polarizing plate 31, and is made incident into a prism 21*a* constituting part of a polarization beam splitter 21 in a color combining prism 22. Herein, the green-light exit-side polarizing plate 31 is low in analysis performance and high in transmittance compared to other polarizing plates. Therefore, heat generation at the polarizing plate 31 as a result of analysis of the green light component is less of a problem.

In addition, the blue light component modulated by the blue-light transmissive liquid crystal display panel Pb is made incident into a prism 21*b* of the polarization beam splitter 21. Moreover, in Embodiment 2, the blue-light liquid crystal display panel Pb and polarization beam splitter 21 are adjacent on the blue light optical path, and no optical element such as a polarizing plate is arranged therebetween. That is, the blue light component from the blue-light liquid crystal display panel Pb is made incident into the polarization beam splitter 21 as it is.

Furthermore, the red light modulated by the red-light transmissive liquid crystal display panel Pr is made incident via a red-light exit-side polarizing plate 20 into a prism 23*a* constituting part of a dichroic prism 23 in the color combining prism 22. The three color components color-combined by the color combining prism 22 are projected by a projection lens 25 onto a screen (unillustrated).

Herein, as is described in Embodiment 1, as well, a general polarization beam splitter has, particularly in terms of an angled light, a higher reflectivity in an S-polarized light than transmittance in a P-polarized light, and analysis with an S-polarized light is higher in performance as an analyzer. With regard to this aspect, by arranging a half-wave plate 32 between the transmissive liquid crystal display panel Pg and polarization beam splitter 21 in the present embodiment, the green light component, which is high in comparative visibility and thus strongly influences brightness, is made incident, as an S-polarized light, into the polarization beam splitter 21 and is reflected by the polarization splitting surface P for projection, therefore, a liquid crystal projector which can project a bright image can be realized.

Furthermore, by providing the polarizing plate 31 on the emergent side of the liquid crystal display panel Pg for green light having a high comparative visibility, analysis performance which declines by being analyzed with a P-polarized light can be compensated, therefore, a high contrast and brightness can be balanced in a projected image.

As a matter of course, without providing the green-light exit-side polarizing plate 31, a sufficiently high contrast can be obtained depending on the characteristics of the polarization beam splitter 21, therefore, the exit-side polarizing plate 31 is not always necessary.

In addition, in the present embodiment, in order to prevent, out of the green light component, an unnecessary P-polarized light component transmitted through the polarization splitting film P and emerged from the non-optical effective surface 21*b*3 of the prism 21*b* from being irradiated into other optical paths or causing heat in other optical paths, a light absorbing member 40 is arranged in a manner opposed to the non-optical effective surface 21*b*3.

Embodiment 3

Figure 4:
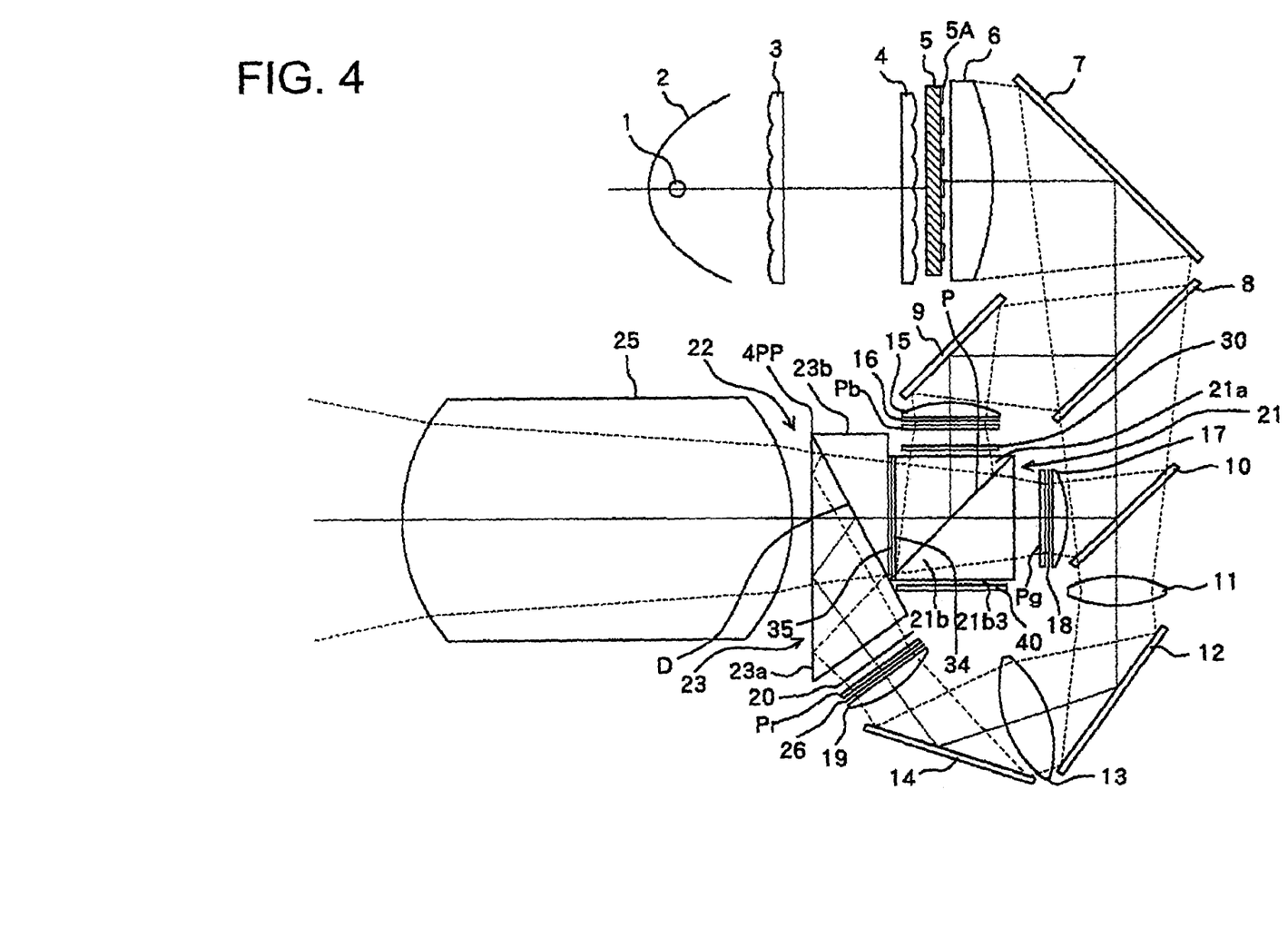
FIG. 4 is a schematic view showing the main part of a liquid crystal projector having a projection-type display optical system of Embodiment 3 of the present invention.

FIG. 4 shows a schematic structure of a liquid crystal projector (a projection-type image display apparatus) using a projection-type display optical system of Embodiment 3 of the present invention. Herein, the present embodiment is identical in the basic structure to Embodiment 1, therefore, symbols identical to those of Embodiment 1 are used for common components, and a description thereof is substituted by the identical symbols.

In the present embodiment, a color selective phase plate 34 and a polarizing plate 35 are provided between the prism 21*a* of the polarization beam splitter 21 and prism 23*b* of the dichroic prism 23. The color selective phase plate 34 has an effect to change the polarized state of only a blue light component by 90°, and a color selective phase plate sold with a product name, ColorSelect® (registered trademark) by ColorLink, Inc. can be employed. The polarizing plate 35 transmits a P-polarized light and absorbs an S-polarized light.

By such a structure, a P-polarized light mixed in a blue light component after a P-analysis, which is inferior in analysis performance to an S-analysis, is converted to an S-polarized light by the color selective phase plate 34 and is absorbed in the polarizing plate 35, whereby a high contrast can be obtained in a projected image.

Moreover, similar to Embodiment 1, in the present embodiment, as well, in order to prevent, out of the blue light component, an unnecessary P-polarized light component transmitted through the polarization splitting film P and emerged from the non-optical effective surface 21*b*3 of the prism 21*b* from being irradiated into other optical paths or causing heat in other optical paths, a light absorbing member 40 is arranged in a manner opposed to the non-optical effective surface 21*b*3.

Moreover, in the above-described respective embodiments, description has been given for cases where the illuminating optical system as proposed in Japanese Patent Laid-Open No. 2001-290010 was used. However, for example, if a method for illumination while compressing an illuminating light flux only in one direction of two directions which are mutually orthogonal at a section orthogonal to the optical axis is employed in a manner compressing an illuminating light in a direction including polarization splitting directions of the polarization beam splitter, a problem such that analysis performance is deteriorated depending on an incident angle of the polarization beam splitter can be reduced, and a higher contrast of a projected image can be obtained.

As has been described above, according to the above-described respective embodiments, as in the conventional cases where a polarizing plate having a high analysis performance is used for first and second color light analysis, occurrence of a thermal problem caused by absorption of a large amount of light into the polarizing plate can be avoided.

In particular, by employing a blue light, which is high in energy compared to other color lights, or a green light, which is contained the most in a white light, as one of the first and second color lights analyzed by the first optical element, occurrence of a thermal problem can be further reliably prevented.

In addition, in a case where a light combined by the second optical element is projected by a projection optical system, the back focal distance of the projection optical system can be shortened.

Accordingly, a bright projected image can be obtained and no large-scale cooling is necessary, and a small-sized color combining optical system, projection-type display optical system, and projection-type image display apparatus can be realized.

In addition, by providing a light processing member such as a light absorbing member, which prevents unnecessary light emerged from the first optical element (prism) from returning to the inside of an optical path, unnecessary light can be prevented from being irradiated into other optical paths or unnecessary light can be prevented from causing heat generation inside other optical paths.

In addition, by employing a green light, which strongly influences contrast, as one of the first and second color lights, and further making this green light, as a P-polarized light, incident into the first optical element so as to be analyzed with an S-polarized light generally having a high analysis performance, a bright, high-contrast projected image can be obtained.

In addition, by employing a green light, which strongly influences contrast, as one of the first and second color lights, and further making this green light, as an S-polarized light, into the first optical element so as to be analyzed with a P-polarized light generally allowing a great light amount, a considerably bright projected image can be obtained.

In addition, by disposing a half-wave plate in the optical path of a color light to be analyzed with a P-polarized light in the first optical element (for example, in front of the incident surface of the first optical element) and then analyzing a color light by the first optical element after a conversion to an S-polarized light, polarizing conditions of all color lights made incident into the first optical element are made uniform, therefore, the first optical element can be easily designed.

In addition, it may also be possible to dispose a polarizing plate in the optical path of a green light made incident into the first optical element and to analyze the green light in two steps of the polarizing plate and first optical element so as to obtain a further higher contrast. At this time, the polarizing plate may be of a low analysis performance of such a degree as to cause no thermal problem.

Furthermore, it may also be possible to dispose a polarizing plate between the first optical element and second optical element to block unnecessary light leaking out from the first optical element so as to obtain a further higher contrast.

In addition, by disposing a wavelength (color) selective phase plate and a polarizing plate between the first optical element and second optical element, a further higher contrast can be obtained.

While preferred embodiments have been described, it is to be understood that modification and variation of the present invention may be made without departing from the scope of the following claims.

What is claimed is:

1. A color combining optical system which combines first color light, a second color light, and a third color light emerging from respective color modulators comprising:
   a first optical element which has a first optical film reflecting light component of a first polarizing direction of the first and second color lights and transmitting light component of a second polarizing direction of the first and second color lights different from the first polarizing direction of the first and second color lights and combines the first and second color lights each having different polarzing directions by the first optical film, wherein the first optical film is also configured to act as an analyzer of the first and second color lights polarized by a corresponding light modulation device; and
   a second optical element which has a second optical film reflecting light in a specific wavelength region and transmitting light in other wavelength regions and combines the third color light transmitted through a separate polarizing plate with the first and second color lights combined by the first optical element, wherein the separate polarizing plate analyzes the third color light.

2. The color combining optical system according to claim 1, further comprising: a light processing member which prevents light emerged from a surface of the first optical element other than an emergent surface for light proceeding toward the second optical element from returning to an optical path for projection again.

3. The color combining optical system according to claim 2, wherein the light processing member is a member which absorbs light.

4. The color combining optical system according to claim 1, wherein on the surface of the first optical element other than the emergent surface for light proceeding toward the second optical element, a film which suppresses light reflection is provided.

5. The color combining optical system according to claim 1, wherein one of the first and second color lights is blue light, the other is green light, and the third color light is red light.

6. The color combining optical system according to claim 5, wherein
   the color combining optical system combines the blue light, green light and red light from three image forming elements each forming an original image,
   the green light is made incident as an S-polarized light from the image forming element for the green light into the first optical element, and
   a half-wave plate and a polarizing plate are provided between the first optical element and the image forming element for the green light.

7. The color combining optical system according to claim 5, wherein
   the color combining optical system combines the blue light, green light and red light from three image forming elements each forming an original image,
   the green light is made incident as a P-polarized light from the image forming element for the green light into the first optical element, and
   into the first optical element, the green light from the image forming element for the green light is made incident without passing through a polarizing plate.

8. The color combining optical system according to claim 1, wherein a half-wave plate is provided at a position before entering the first optical element in an optical path of one color light out of the first color light and second color light.

9. The color combining optical system according to claim 1, wherein an optical path of the first color light is formed so that the first color light reflected on the first optical film is made incident into the second optical element, and a half-wave plate is provided at a position before entering the first optical element in the optical path of the first color light.

10. The color combining optical system according to claim 9, wherein a polarizing plate is provided at a position before entering the first optical element in the optical path of the first color light.

11. The color combining optical system according to claim 9, wherein
the color combining optical system combines the first, second, and third color lights from three image forming elements each forming an original image,
the first color light is made incident into the first optical element from the image forming element for the first color light, and
the polarizing plate provided in the optical path of the first color light is provided between the first optical element and the image forming element for the first color light.

12. The color combining optical system according to claim 1, wherein
the color combining optical system combines the first, second, and third color lights from three image forming elements each forming an original image,
one of the first color light and second color light is green light, and
a polarizing plate is provided between the first optical element and the image forming element for the green light.

13. The color combining optical system according to claim 1, wherein a wavelength selective phase plate is provided between the first optical element and the second optical element.

14. The color combining optical system according to claim 13, wherein a polarizing plate is provided between the first optical element and the second optical element.

15. The color combining optical system according to claim 1, wherein
the color combining optical system combines the first, second, and third color lights from three image forming elements each forming an original image,
one of the first color light and the second color light is blue light, and
into the first optical element, the blue light from the image forming element for the blue light is made incident without passing through a polarizing plate.

16. The color combining optical system according to claim 1, wherein
the color combining optical system combines the first, second, and third color lights from three image forming elements each forming an original image,
one of the first color light arid the second color light is blue light, and
a half-wave plate is provided but no polarizing plate is provided between the first optical element and the image forming element for the blue light.

17. The color combining optical system according to claim 1, wherein the first optical element has:
a first incident surface into which the first color incident;
a second incident surface into which the second color light having the second polarizing direction is made incident;
a first emergent surface from which light combined by the first optical film emerges toward the second optical element; and
a second emergent surface from which unnecessary light emerges, and the second optical element has:
a third incident surface into which light emerged from the first emergent surface is made incident;
fourth incident surface into which the third color light is made incident; and
a third emergent surface from which light combined by the second optical film emerges.

18. The color combining optical system according to claim 1, wherein the second optical element reflects the third color light at least twice and combines the third color light with the first and second color lights.

19. The color combining optical system according to claim 18, wherein the second optical element combines the third color light with the first and second color lights by reflecting the third color light on the second optical film after totally reflecting the third color light inside the second optical element.

20. A projection-type display optical system comprising:
a light source;
a color separating optical system which separates light from the light source into first, second, and third color lights;
first, second, and third modulators each forming a original image to modulate the first, second, and third color lights;
the color combining optical system according to claim 1, combines the first, second, and third color lights from the modulators; and
a projection optical system which projects light combined by the color combining optical system onto a projection surface.

21. A projection-type image display apparatus comprising:
the projection-type display optical system according to claim 20; and
a drive circuit which drives the first, second, and third modulators.

22. An image display system comprising:
the projection-type image display apparatus according to claim 21; and
an image information supplying apparatus which supplies image information to make the first, second, and third modulators form original images to the projection-type image display apparatus.

23. A color combining optical system which combines a first color light, a second color light, and a third color light emerging from respective color modulators comprising:
a first optical element which has a polarization split film configured to reflect light component of a first polarizing direction of the first and second color lights and to transmit light component of a second polarizing direction of the first and second color lights, and analizes the polarization split film is further configured to act as an analyzer of the first and second color lights polarized by a corresponding light modulation device and to combine the first and second color lights each having different polarizing directions; and
a second optical element which combines the third color light transmitted through a separate polarizing plate with the first and second color lights combined by the first optical elements, wherein the separate polarizing plate analyzes the third color light.

24. The color combining optical system according to 23, claim further comprising:
a color selective phase plate which is provide between the first optical element and the second optical element.

25. A projection-type image display apparatus comprising:
a first image forming element, a second image forming element, and a third image forming element which correspond respectively to a first light, a second light, and a third light, an illumination optical system which illuminates a first image forming elements a second image forming element, and a third image forming element by a light from a light source, the color combining optical system according to claim 23, which combines light from the first image forming element, the second image forming element, and the third image forming element; and a projection optical system which projects light from the color combining optical system.

26. The projection-type image display apparatus according to claim 25, wherein the illumination optical system includes an optical system which compresses light flux from the light source, in a substantially parallel direction to a polarization split plane of the polarization split film.

27. The projection-type image display apparatus according to claim 26, wherein the polarization split plane is a plane which transmits and reflects the light flux.

28. The projection-type image display apparatus according to claim 25, wherein the illumination optical system compresses an illumination light flux with only one direction of two orthogonal directions each other, in a surface orthogonalizing to an optical axis of the illumination optical system.

29. The projection-type image display apparatus according to claim 28, wherein the one direction is parallel to the polarization split plane of the polarization split film.

30. An image display system comprising:

the projection-type image display apparatus according to claim 25, and an image information supplying apparatus which supplies image information to make the first, second, and third image forming elements form original images, to the projection type image display apparatus.

31. The color combining optical system according to claim 24, further comprising a polarization plate which is provided between the color selective phase plate and the second optical element for the first and the second color light.

32. A color combining optical system which combines a first color light, a second color light, and a third color light emerging from respective color modulators comprising:

a first optical element which has a polarization split film configured to reflect light component of a first polarizing direction of the first and second color lights and to transmit light component of a second polarizing direction of the first and second color lights, and the polarization split film is further configured to act as an analyzer of the first and second color lights polarized by a corresponding light modulation device and to combine the first and second color lights each having different polarizing directions;

a second optical element which combines the third color light transmitted through a separate polarizing plate with the first and second color lights combined by the first optical element, wherein the separate polarizing plate analyzes the third color light;

a color selective phase plate provided between the first optical element and the second optical element; and a polarization plate provided between the color selective phase plate and the second optical element.

33. A projection-type image display apparatus comprising:

a first image forming element, a second image forming element, and a third image forming element which correspond respectively to a first light, a second light and a third light;

an illumination optical system which illuminates the first image forming elements, the second image forming element, and the third image forming element by a light from a light source;

the color combining optical system according to claim 32, which combines light from the first image forming element, the second image forming element, and the third image forming element; and a projection optical system which projects light from the color combining optical system.

34. The projection-type image display apparatus according to claim 33, wherein the illumination optical system compresses an illumination light flux with only one direction of two orthogonal directions each other, in a surface orthogonalizing to an optical axis of the illumination optical system.

* * * * *